July 12, 1966  O. C. BENHAM, JR  3,260,409
APPARATUS FOR DISPENSING LIQUIDS
Filed Sept. 17, 1964  4 Sheets-Sheet 1
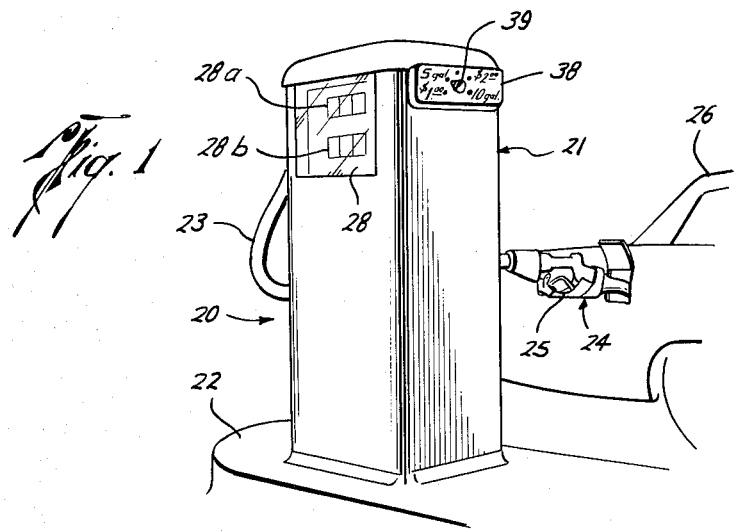
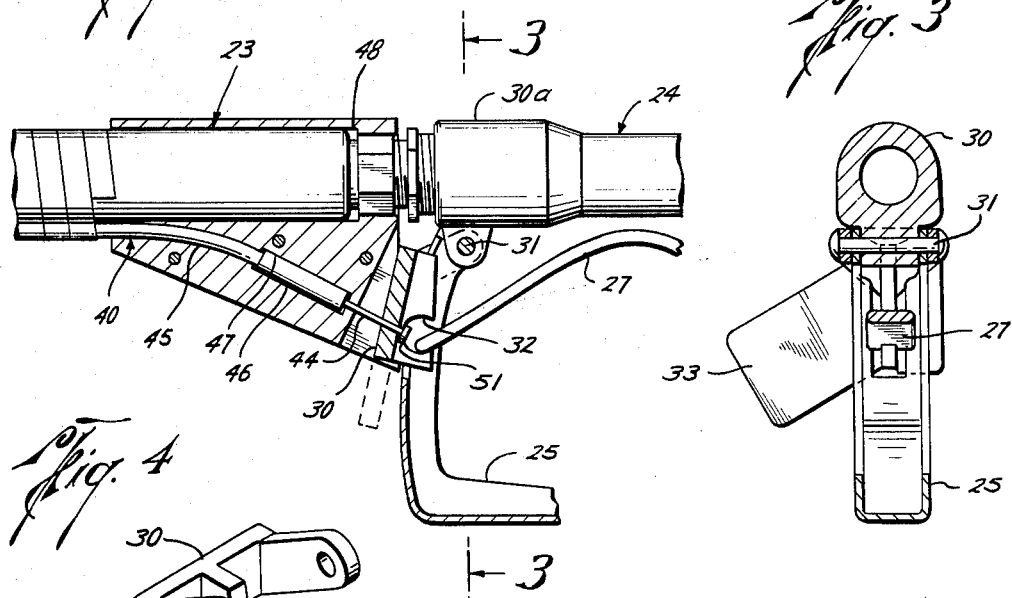
Oliver C. Benham, Jr.
INVENTOR.
BY Browning, Simms, Ayer & Eickenroht
ATTORNEYS July 12, 1966  O. C. BENHAM, JR  3,260,409
APPARATUS FOR DISPENSING LIQUIDS
Filed Sept. 17, 1964  4 Sheets-Sheet 2
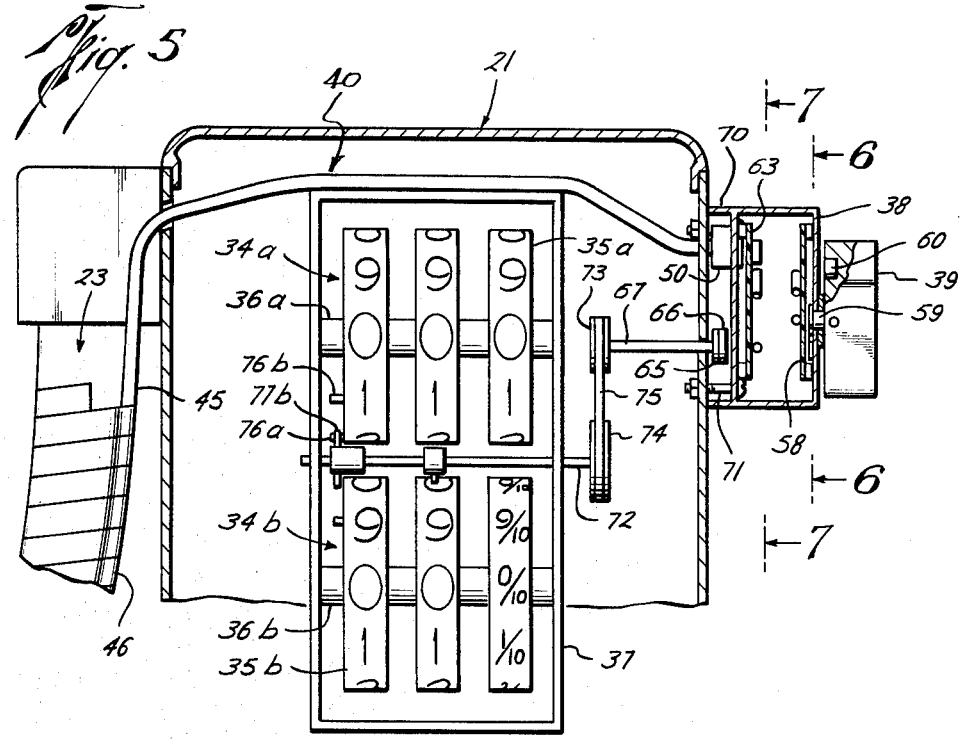
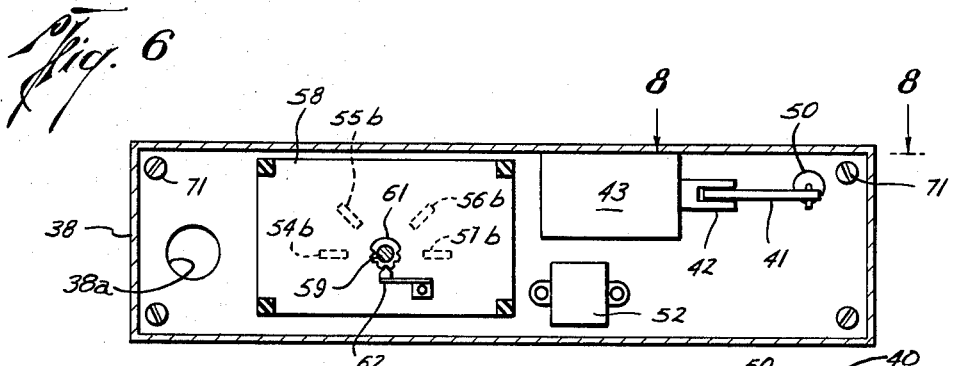
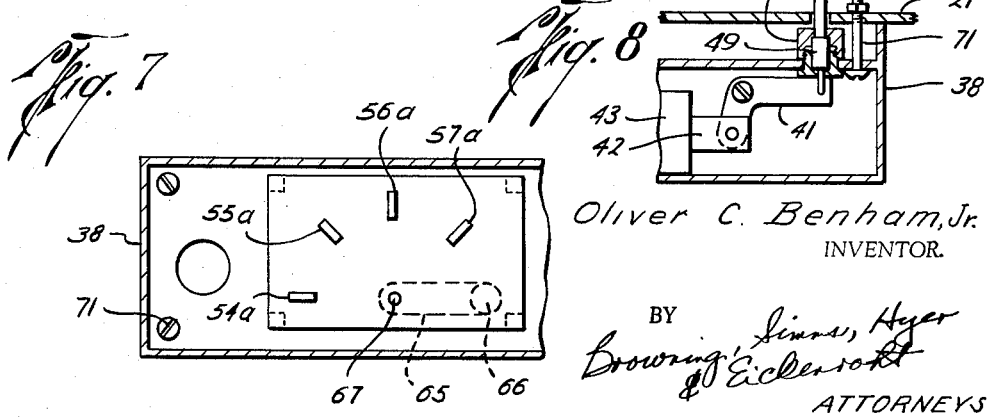
Oliver C. Benham, Jr.
INVENTOR.
BY
ATTORNEYS July 12, 1966  O. C. BENHAM, JR  3,260,409
APPARATUS FOR DISPENSING LIQUIDS
Filed Sept. 17, 1964  4 Sheets-Sheet 3

Oliver C. Benham, Jr.
INVENTOR.

BY Browning, Simms, Hyer & Eickenroht
ATTORNEYS

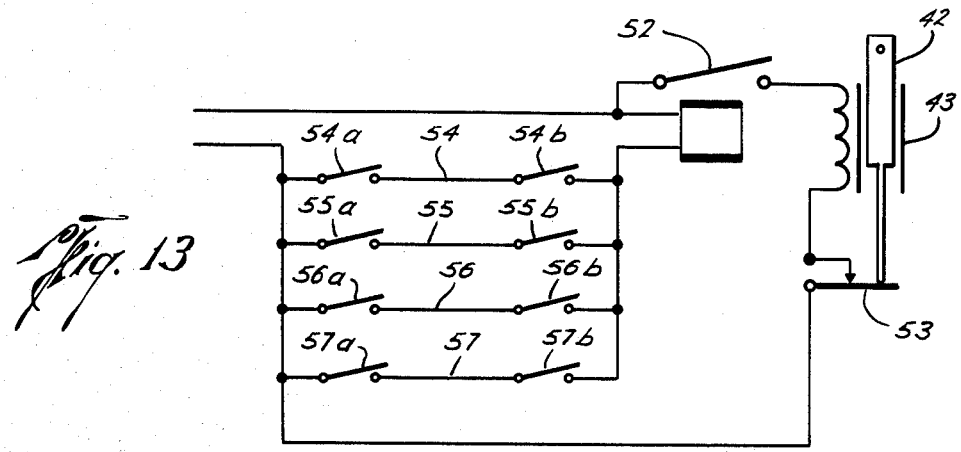
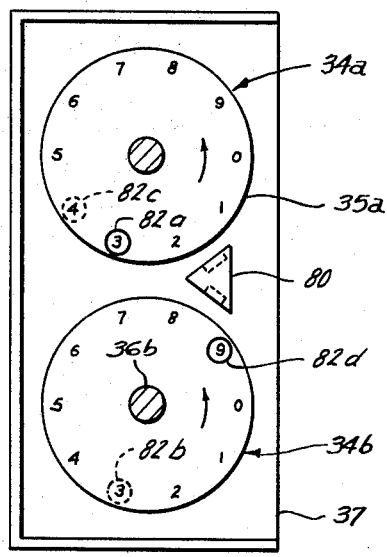
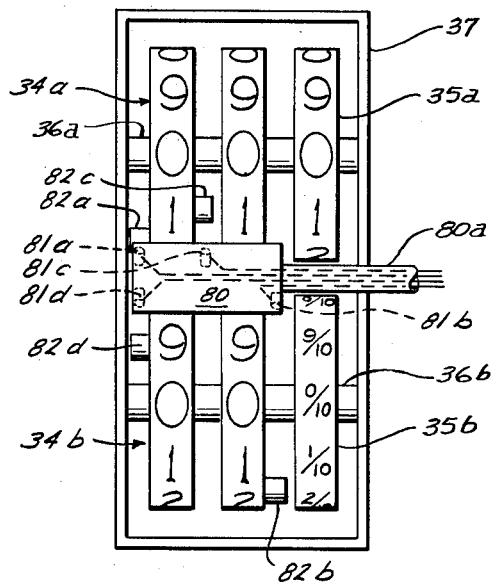

3,260,409
APPARATUS FOR DISPENSING LIQUIDS
Oliver C. Benham, Jr., Bellaire, Tex., assignor, by direct and mesne assignments, to Texas Industrial Manufacturing Company, Houston, Tex., a corporation of Texas
Filed Sept. 17, 1964, Ser. No. 397,196
10 Claims. (Cl. 222—20)

This invention relates to liquid dispensing apparatus, such as the so-called "pumps" used to deliver gasoline at automobile service stations. More particularly, it relates to improvements in and to such apparatus which permit the operator of same to predetermine the amount of liquid to be dispensed.

In modern gasoline pumps, flow is controlled by a valve in the nozzle on the end of the hose extending from the pump housing. Thus, the amount of gasoline which has been dispensed is computed and indicated on the face of the pump housing with the hose full of gasoline. Although the customer does not receive this measured amount of gasoline within the hose, he has nevertheless received a compensating amount from the "wet" hose as the nozzle valve is first opened.

In this standard pump, the amount of gasoline so dispensed is indicated by accumulating counter wheels which are mounted within the pump housing and visible from the exterior thereof. There are two groups of these wheels, one for indicating in gallons and the other in money, and the two groups rotate about closely spaced parallel axes so that they are visible to the operator and customer in the same general area of the housing. The manner in which the money wheels accumulate in relation to the gallon wheels is of course adjustable with changes in the price of the gasoline per gallon.

The nozzle valve is normally closed and adapted to be opened by means of a lever at the handle for the nozzle. When the customer wants a full tank, the operator moves the lever to a valve opening position and then moves an arm, which is also located at the nozzle handle, into a position in which it engages one end of the lever to releasably hold it in such position. When the tank is filled with gasoline, its level actuates a mechanism which automatically releases the lever, either from the arm or at its other end, to thereby permit the valve to close.

However, if the customer wants less than a full tank, the operator must devote his attention toward maintaining control over the lever in order to release it, and thereby permit the valve to return to closed position, when the desired amount of gasoline is indicated on the pump housing. This procedure not only consumes time which the operator might otherwise spend servicing the customer's car, but also is subject to human error.

It is understandable, therefore, that considerable effort has been made to develop apparatus of this type in which the operator may preset the amount of gasoline to be dispensed, either in terms of gallons or money. For various and sundry reasons, none of these efforts have produced apparatus having this facility which has had wide commercial acceptance.

Many of these prior devices provided a shutoff of flow at some point upstream of the nozzle valve. Obviously, an attempt to use any such device with present day pumps would require that an adjustment or allowance be made for the "wet" nozzle. Although other earlier devices are intended to control flow at the nozzle, they are objectionable for other reasons involving the means by which a signal is transmitted from the pump, flowmeter or indicating means to the nozzle valve. This is true, for example, of those which would transmit this signal either electrically or pneumatically.

Apart from these latter problems, prior devices have also been objectionable due to the manner in which the signal is initiated when the predetermined amount of gasoline has been dispensed. Thus, some have been too bulky and unwieldy for use in the pump housing, particularly in and around the counter wheels, and thus not suitable for attachment to existing equipment. Others have required complicated and expensive electrical circuitry, as well as explosion-proof switch boxes, and still others have been susceptible to both of these objections.

An object of this invention is to provide apparatus of this type which overcomes these and other shortcomings.

Another object is to provide apparatus of the character above described in which a signal is transmitted to the nozzle for controlling flow without the dangers of explosion inherent in electrical conduits or the strong possibility of failure due to leakage and other causes which are inherent in pneumatic lines.

A more particular object is to provide such apparatus having means for so transmitting the signal which is not only safe and dependable, but also simple and inexpensive to manufacture.

A further object is to provide apparatus of this type having a means for initiating and imparting such a signal which permits the operator to select the amount to be dispensed in either gallons or money with a minimum risk of human error.

Still another object is to provide such apparatus in which the signal is initiated and imparted by equipment which requires very simple electrical circuitry, which consumes a minimum of space within the pump housing, and which, in at least one embodiment, does not require an explosion-proof switch box.

A still further object is to provide a device of the character described in the foregoing objects which is in all respects well suited for attachment to existing apparatus of this type.

These and other objects are accomplished, in accordance with the illustrated embodiments of this invention, by improvements which comprise a means on the exterior of the pump housing for selecting the amount of gasoline to be dispensed, a means for initiating and imparting a signal when the selected amount of gasoline has been dispensed, and a cable mechanically connected to the arm on the nozzle for moving the arm to lever releasing position in response to said signal so as to thereby permit the valve in the nozzle to close. Thus, in the use of this improved apparatus, and after making the appropriate selection, the operator need only move the lever into a position in which it is releasably held by the arm, and then attend to other business with the assurance that the valve will close automatically when the selected amount of gasoline has been dispensed.

The cable must exert approximately 3 pounds of force and must move the arm approximately 1/8 to 1/4 inches in order to release the lever. I have found that this may be accomplished by a thin but relatively strong cable made up of twisted wire strands surrounded by a sheath and supported along the length of the hose. One end of this cable is connected to a reciprocable actuator which moves in one direction in response to the signal so that the cable is pulled to release the lever. Conversely, upon resetting the apparatus in order to dispose a subsequent preselected amount of gasoline, the cable is pulled in the opposite direction to return the arm to lever holding position and to move the actuator back to its original position. Thus, the twisted strands of the cable are pulled in both directions—i.e., in tripping the arm on the nozzle as well as in resetting the arm—so that there is a minimum of stretch. Also, due to the relatively small amount of force and travel which is required, I have found it possible to actuate the cable with an ordinary solenoid when the signal is an electrical one.

In accordance with other improvements of the invention, the signal which is thus transmitted to the nozzle for closing the valve is imparted to the actuator through one of a plurality of normally open switches which are selectively closed in accordance with the amount of gasoline to be dispensed. These switches are located in a weatherproof box on the exterior of the housing which has a face plate with indicia thereon representing different amounts of gasoline, and a part is movable over the face plate for closing a selected one of such switches at each of the indicia. Additional normally open switches are each connected in series with one of the first-mentioned switches, and there is means on the counter wheels for successively closing different ones of the additional switches so as to close the circuit including the selected switch and thereby initiate and impart the signal to the actuator when the selected amount of gasoline has been dispensed.

In one embodiment of the invention, these additional switches are also located in the weather-proof box exteriorly of the housing, and a shaft is mounted for rotation within the housing close to each of the counter wheels. There are parts such as pins on the counter wheels engageable with similar parts on the shaft to rotate the shaft as the counter wheels accumulate the amount of gasoline to be dispensed, and this shaft is in turn connected to a means adjacent the switch box for successively closing selective ones of the additional switches in response to the shaft rotation.

In another embodiment of the invention, the additional switches are contained within an explosion-proof box or housing which extends close to the counter wheels within the pump housing. More particularly, these additional switches are magnetic and there are magnets on the counter wheels for successively closing elected ones of them. Electrical wires extend from the explosion-proof housing through the side of the pump housing so as to connect the additional switches with the first-mentioned switches exteriorly of the housing for closing the circuit containing both closed switches.

Thus, in both of the above-described embodiments, the parts for so initiating and imparting the signal are arranged on both groups of counter wheels, so that, in each case, the signal is imparted to the actuator by either or both of an accumulation of money or gallons on the counter wheels. Thus, the indicia on the face of the switch box includes both gallons and money, and the operator need move only the single part on the exterior of the pump housing in selecting the desired number of gallons or money, as he chooses.

In adapting existing pump housings for use with each embodiment above described, the pump housing need only be drilled to receive either an extension of the shaft or a tube containing the electrical wiring connecting with the magnetic switches. When so received, these parts fit within the V-shaped space formed between adjacent faces of the two groups of counter wheels. There is no need to modify the counter wheels other than to provide them with the above-described parts.

Since the counter wheels will indicate the amount of gasoline dispensed, regardless of the price of same, the device of this invention is easily and quickly adapted for conversion in case of price changes. That is, when certain price limits are exceeded, so that the order of accumulation of the amounts represented on the face of the switch box is changed, the operator need only change the indicia on the box.

In the drawings, wherein like reference characters are used throughout to designate like parts:

FIG. 1 is a perspective view of a gasoline pump embodying the improvements of the present invention and located at a typical installation, and with the nozzle on the end of the hose inserted into the tank of an automobile being serviced;

FIG. 2 is an enlarged longitudinal sectional view of the end of the hose and the handle portion of the nozzle attached to the hose, and with the lever of the nozzle releasably held by the arm in a position to open the valve in the nozzle and thereby dispense gas therefrom;

FIG. 3 is a cross sectional view of the nozzle, as seen along broken line 3—3 of FIG. 2;

FIG. 4 is a perspective view of the lever holding arm;

FIG. 5 is a vertical sectional view on an enlarged scale of the upper end of the pump housing, and showing in elevation the two groups of counter wheels together with a switch box on the exterior thereof, and a shaft having parts thereon cooperable with parts on the counter wheel in accordance with one of the above-described embodiments of the invention;

FIG. 6 is a vertical sectional view of the switch box, as seen along broken line 6—6 of FIG. 7;

FIG. 7 is a partial vertical sectional view of such box, as seen along broken line 7—7 of FIG. 5;

FIG. 8 is a horizontal sectional view of such box, as seen along broken line 8—8 of FIG. 6;

Figure 9:
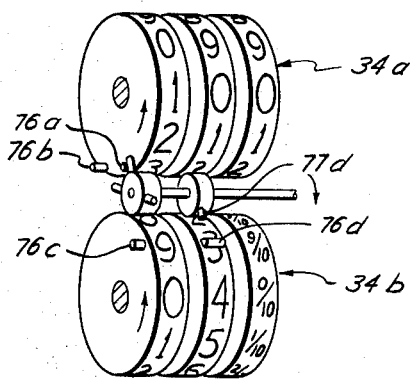
Figure 10:
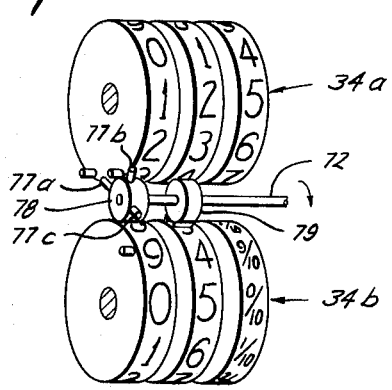
Figure 11:
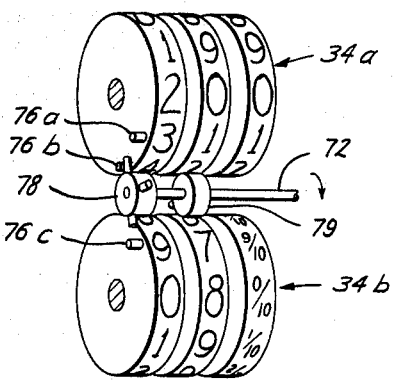

FIGS. 9 to 12, inclusive, are perspective views of the two sets of counter wheels and the rotatable shaft of FIG. 5, and illustrating in sequence their relative positions during an accumulation on the counter wheels of the different amounts of gasoline which are indicated on the face of the box;

FIG. 13 is an electrical diagram of the circuit including the two sets of switches and the actuator connected to the end of the cable adjacent the pump housing;

FIG. 14 is a diagrammatic view of the other embodiment of the invention wherein an explosion-proof box or housing enclosing the additional magnetic switches is disposed close to both groups of counter wheels; and FIG. 15 is an elevational view, similar to part of FIG. 5, of the counter wheels together with the housing shown in FIG. 14 and the tube through which electrical wires extend from the switches within the housing.

With reference now to the details of the above-described drawings, the typical gasoline pump shown in FIG. 1, and designated in its entirety by reference character 20, includes an upright housing 21 mounted upon an island 22 located at an automobile service station. There is a flexible hose 23 mounted on and extending from one side of the housing, and a nozzle 24 on the free end of the hose has a handle 25 to enable the operator to insert it into the gas tank of an automobile 26 located adjacent the service station island. More particularly, this nozzle has a lever 27 within the handle which may be raised to the position shown in FIG. 2 in which it opens a normally closed valve (not shown) in the nozzle, as previously described.

As well known in the art, the pump housing 20 contains the accumulative type counter wheels best shown in FIG. 5, and there is suitable equipment within or beneath it for pumping gasoline from a storage tank into the upper end of the hose shown in FIG. 5 as well as measuring the flow of such gasoline by means of a flowmeter upstream of the hose. This measurement is in turn conveyed to the counter wheels to cause them to rotate and thereby accumulate the amount of gasoline dispensed from the end of the nozzle 24. This amount is indicated, in both money and gallons, through a window 28 on the exterior of the pump housing. More particularly, this window permits the operator and the customer to view numerals on the counter wheels through openings 28a and 28b outlined within the window. Conventionally, these numerals are the ones on the counter wheels which are disposed nearest to the side of the pump housing in which the window 28 is disposed.

As previously described, the raising of lever 27 into the upper position shown in FIG. 2 will hold the normally closed valve of the nozzle in its open position. As well known in the art, this valve is contained within the tubular portion 30a of the nozzle, which as can be seen from FIG. 2 is threadedly coupled at one end to the end of the hose 23. The lever 27 may be held in its valve opening position by means of an arm 30 swingably mounted by pins 31 on the lower side of tubular portion 30a of the nozzle.

A notch 32 on a rib 32a on the outer face of the arm 30 is adapted to receive the outer end of lever 27 in its upper position. Thus, the operator first raises the lever to valve opening position, and then forces the arm 30 into a position to cause the notch to receive the end of the lever. There is a wing 33 located on one side of the arm in position to be engaged by the operator's thumb in order to facilitate this operation. As will be understood from FIG. 2, the tendency of arm 30 to swing counterclockwise as well as the weight of the lever 27 will maintain the outer end of the lever in the arm notch until this force is overcome by a force urging the lever downwardly, as occurs in the filling of a tank, or until the arm is swung clockwise to move the notch beyond the lever, as occurs when the amount of gasoline is preselected in accordance with this invention.

As previously described, and as shown in FIG. 5, there are two groups 34a and 34b of counter wheels disposed within the upper end of pump housing 21. More particularly, the counter wheels 35a and 35b of each of such groups are mounted upon shafts 36a and 36b for rotation in the same direction about parallel axes. These shafts are journaled within a cage 37 mounted in any suitable manner within the upper end of the pump housing 21.

The counter wheels are shown in FIG. 5 in the "zero" positions they occupy prior to the accumulation of the amount of gasoline dispensed. Their accumulation is, of course, initiated by the pump and flow measuring apparatus, which in turn is initiated by removal of nozzle 24 from its supported position on the side of the pump housing and opening of the dispensing valve. On the other hand, the pumping operation and thus the accumulation of the counter wheels is stopped by the closing of the nozzle valve. At this time, the counter wheels may be cleared or returned to "zero" position in a manner well known in the art.

As previously mentioned, and in accordance with the novel aspects of the invention to be described to follow, the accumulation of the counter wheels imparts a signal to an actuator within a box 38 mounted on the side of pump housing 21 opposite the nozzle 23. More particularly, and as shown in FIG. 1, this box has indicia on its outer face which guide the operator in preselecting the amount of gasoline to be dispensed through the nozzle 24. For this purpose, there are numerals on the face of the box representing five and ten gallons as well as one and two dollars. The operator selects one such amount by turning a pointer 39 toward it, inserting the end of the nozzle into the tank, and raising the lever 27, and moving the arm 30 to the position shown in FIG. 2, just as he would do in filling the tank. However, in accordance with this invention, when the selected amount of gasoline has been dispensed and is indicated upon the counter wheels, the arm 30 of the nozzle is mechanically moved rearwardly from the holding position of FIG. 2 so as to release the lever 27 and thereby permit the valve to close.

For this latter purpose, a cable 40 is supported along the length of the hose 23 and is connected at one end to the arm 30 and at its other end to a bell crank 41 pivotally connected to the outer end of the plunger 42 of a solenoid 43 within box 38, as shown in FIGS. 6 and 8. Thus, upon actuation of the solenoid so as to retract the plunger 42, the bell crank 41 is rocked to pull the end of the cable shown in FIGS. 6 and 8 and thereby pull the opposite end of the cable so as to withdraw the arm 30 from lever holding position. Then, in order to reset the device, the lever 27 need merely be raised to the position shown in FIG. 2 and the arm 30 swung counterclockwise back to the position of FIG. 2 wherein the notch 32 thereon receives the outer end of the lever 27. This pulling of the cable in the opposite direction will in turn withdraw the plunger 42 of the inactive solenoid 43 and thus return the solenoid and its plunger to a position for subsequent actuation in pulling the cable so as to again move the arm 30 to lever releasing position.

As previously described, the cable 40 comprises a plurality of twisted wire strands 44 which are surrounded by a sheath 45. As shown in FIGS. 2 and 5, the sheath is supported from the hose 23 by wrappings of tape 46. Alternatively, of course, the sheath may be molded into the hose 23.

The outer end of sheath 45 has an anchor 46 which is fitted closely within a cylindrical opening 47 in a hose adaptor 48 for holding such anchor against substantial longitudinal movement. An anchor 49 on the opposite end of the cable 40 is held against longitudinal movement by a bracket 50 on the rear wall of switch box 38 (see FIGS. 5 and 8). The adaptor 48 is fixedly connected about the end of nozzle 23 and has an opening therethrough connecting with opposite ends of the cylindrical recess 47 so as to receive the outer end portion of the sheath and wire and direct such wire through opening 50a in arm 30. An enlarged head 51 on the end of the wire holds it in position for moving the arm 30 clockwise and thus to lever releasing position in response to a relatively small amount of longitudinal movement.

As shown in the wiring diagram of FIG. 13, the solenoid 43 is electrically connected in series with a relay 52 so that, upon actuation of the relay, the plunger 42 of the solenoid is retracted or moved downwardly. In so doing, the plunger opens a normally closed switch 53 so as to reopen the circuit until such time as the solenoid plunger is withdrawn in resetting the device. This circuit derives its power from any suitable source within and around the pump housing, such as that provided for the light bulbs in the pump housing.

The relay 52 is actuated so as to in turn actuate the solenoid 43 by the closing of both switches connected in series in any one of parallel lines 54, 55, 56 or 57. Thus, as can be seen from FIG. 13, normally opened switches 54a and 54b are connected in series in line 54, normally open switches 55a and 55b are connected in series in line 55, normally open switches 56a and 56b are connected in series in line 56, and normally open switches 57a and 57b are connected in series in line 57. Obviously, the first set of such switches to be closed at the same time will actuate the relay 52.

As best shown in FIG. 6, the switches 54b, 55b, 56b and 57b are mounted on the back side of a panel 58 carried on inner side of the face of switch box 38. More particularly, these switches are of a magnetic type and are arranged in a semi-circle about the axis of shaft 59 of pointer 39 swingably movable over the face of the box. As shown in FIG. 5, there is a magnet 60 on the inner side of the pointer 39 for movement in substantially the same semi-circle, so that the pointer is manually rotatable into a position in which its magnet 60 is disposed opposite a selected one of the switches 54b, 55b, 56b and 57b for closing same.

As shown in FIG. 5, the pointer shaft 59 is rotatable within and extends through an opening in the face of switch box 38. As shown in FIG. 6, it carries a notched collar 61 which is cooperable with a flexible key 62 for holding the pointer in any one of the four switch closings described as well as a neutral position intermediate switches 55b and 56b. In this neutral position, of course, none of the last-mentioned switches is closed.

As best shown in FIG. 7, the switches 54a, 55a, 56a and 57a, which are also of the magnetic type, are mounted on the side of another panel 63 supported within the switch box. Each one of this latter group of switches is adapted to be closed by an arm 65 rotatable between the side of the pump housing and the rear wall of the switch box and having a magnet 66 on its outer end swingable through a semi-circle which is substantially coincidental with the semi-circular arrangement of the last-mentioned switches.

More particularly, and best shown in FIG. 5, the arm 65 is mounted on a shaft 67 which extends through and rotates within an opening in a portion of the pump housing over which the switch box is mounted for connection with the signal initiating and imparting means to be described hereinafter.

Thus, as will be understood from the foregoing description, when one of the "b" series of switches is closed by manipulation of the pointer 39 and the arm 65 is swung into a position in which its magnet 66 is disposed opposite the corresponding switch of the "a" series, the circuit containing such switches is closed so as to actuate the relay 52 and thus solenoid 43. Thus, for example, upon swinging of the pointer 39 to the position shown in FIG. 1, wherein its outer end is opposite the "5 gallon" mark, the switch 55 is closed. Then, as five gallons are accumulated on the counter wheels, and in a manner to be described, the shaft 67 is rotated so as to swing the arm 65 into position for closing the switch 55a, at which time the circuit is closed.

At least the face and rear wall of the box 38 are of plastic or other suitable material which will not interfere with the magnetic attraction between the arm and pointer and the switches. The rear wall is held in spaced relation to the side of the pump housing by wall extensions 70 and is secured to such housing by bolts 71 extending therethrough. The portion of the switch box 38 between its face plate and rear wall is imperforate except for the openings through which shaft 59 and bolts 71 extend as well as a hole 38a (FIGS. 6 and 7) through which an electrical conduit may extend to connect the electrical components within the box with a power source. More particularly, these parts fit closely within the openings so as to enclose such components in weather-proof fashion. However, since it is removed from within the pump housing and is located a sufficient distance above ground level, this enclosure need not be explosion-proof.

As shown in FIG. 5, the shaft 67 is connected by means of sprockets 73 and 74 and a chain 65 to shaft 72 which extends close to both groups 34a and 34b of counter wheels. This permits the switch box 38 to be disposed at a safe height above the ground surface in and about the pump housing. The same purpose could be served by a flexible shaft.

Figure 12:
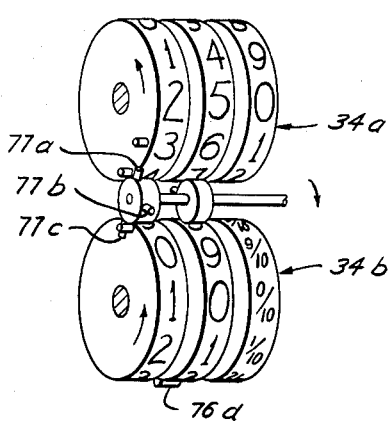

The opposite ends of shaft 72 are mounted within the sides of cage 37 so as to rotate about an axis parallel to the axes of rotation of the shafts 36a and 36b for the counter wheels. More particularly, and as best shown in FIGS. 9 and 12, the shaft 72 is disposed within the substantially V-shaped space between one side of the lower portion of the upper group 34a of counter wheels and the upper side of the upper portion of the lower group 34b of counter wheels, whereby such shaft may be located within existing pump housings.

The upper group 34a of counter wheels have numerals thereon for indicating the amount of gasoline dispensed in money, while the lower group 34b have numerals thereon which indicate such amount in gallons. Thus, as well known in the art, the left-hand counter wheel of the group 34a has numerals representing dollars, the middle counter wheel has numerals representing units of ten cents and the righthand counter wheel has numerals indicating single cents. On the other hand, the numerals on the left-hand counter wheels of the group 34b represent units of ten gallons, those on the middle counter wheel represent units of one gallon, and those on the right-hand counter wheel represent units of tenths of gallons.

In this embodiment of the invention, wherein the face of the box is marked for 5 and 10 gallons and one and two dollars, there are pins 76a and 76b upon the left-hand counter wheel of group 34a, a single pin 76c on the left-hand counter wheel of group 34b, and pin 76d on the middle counter wheel of group 34b. In the case of the left-hand counter wheels, the pins extend outwardly from the outer side thereof, while in the case of the middle counter wheel, the pin 76d extends radially outwardly from the peripheral face of such wheel. In a manner to be described to follow, these pins on the counter wheels are adapted to cooperate with pins 77a, 77b and 77c extending outwardly from collar 78 adjustably mounted on the shaft 72, as well as with a pin 77d on collar 79 adjustably mounted in similar fashion upon the shaft 72. More particularly, and as can be seen from FIGS. 9 to 12, the pins 76a, 76b and 76c on the left-hand counter wheels of the groups 34a and 34b are adapted to cooperate with pins 77a, 77b and 77c on collar 78, while the single pin 76d on the center counter wheel of group 34b is adapted to cooperate with the single pin 77d on collar 79 about the shaft 72.

The counter wheels of both groups are moved into the "zero" position of FIG. 5 upon completion of a dispensing operation. This clearing out of the counter wheels causes a reversal of the above-described interengagement of the pins so as to rotate the arm 67 into its inactive position shown in FIG. 7. Then, upon accumulation of the various counter wheels of the two groups, the shaft 72 is intermittently rotated in the manner described below to in turn intermittently rotate the shaft 67 and arm 65 thereon.

With the pins arranged on the counter wheels and shaft 72 in the manner illustrated, the arrangement of the indicia on the face of box 38 depends on the price of the gasoline. More particularly, the representation of one dollar opposite switch 54b, five gallons opposite switch 55b, two dollars opposite switch 56b, and ten gallons opposite switch 57b assumes such price to be such that such amounts will cause rotation of shaft 72 in the order in which they are described. However, a change in price which would cause a change in this order merely requires a corresponding change in the order of the indicia on the face of switch box 38.

In any case, with specific reference to the illustrated arrangement of the pins, and as will be understood from a comparison of FIG. 5 with FIG. 9, rotation of counter wheels of group 34a as well as counter wheels of group 34b, both in the counter clockwise direction as viewed in FIGS. 9 to 12, will cause pin 76a to move around to a position for engaging and rotating the pin 77b so as to thereby rotate the shaft 72 in a counterclockwise direction, as seen from FIGS. 9 to 12. More particularly, pin 76a is disposed opposite the numeral "3" on the left-hand counter wheel of group 34a so that it so engages and rotates pin 77b as the numeral "1" moves into indicating position. This rotation of the shaft 72 will in turn rotate the shaft 67 and thus swing arm 65 in a clockwise direction, as shown in FIG. 7, so that the magnet 66 on the arm is disposed opposite switch 54a. Thus, if the switch 54b had been closed by manipulation of the pointer 39 on the basis that the customer had requested one dollar's worth of gasoline, the solenoid 43 would be actuated so as to pull the cable 40 and thereby release the arm 30 from lever holding position.

However, assuming that this amount had not been selected, the counter wheels would continue to accumulate until the pin 76d engages and rotates the pin 77d on the shaft so as to further rotate the shaft in the same direction as before and thereby move the arm 65 into a position in which its magnet is opposite switch 65a. This would shut off the nozzle in the event the operator has closed the switch 55b in selecting five gallons of gasoline. Thus, as can be seen from FIGS. 9 and 10, the pin 76d is located adjacent the numeral "3" on the middle counter of the group 34b so that it engages and rotates the pin 77d as the numeral "5" on the middle gallon wheel moves into indicating position.

Assuming that the operator had not set the pointer 39 for dispensing only five gallons of gasoline, the counters would continue to accumulate until the pin 76b moves into engagement with the pin 77a about the shaft 72 so as to further rotate the shaft and thus further swing the arm 65a into a position in which its magnet 66 is opposite switch 56a. This, of course, would permit the valve in the nozzle to close in the event switch 56b were closed by the operator. Once more assuming that this latter amount had not been selected by the operator, the counters would continue to accumulate until pin 77c on the left-hand counter of the group 34b engages the pin 76c so as to rotate it and thereby rotate the shaft 72 into a position for swinging arm 65 into a position in which its magnet is opposite switch 57a.

Obviously, the illustrated device of this invention may be adapted for predetermining different amounts than those described. This would merely require a rearrangement of the pins on the counter wheels and shaft.

In the embodiment of the invention illustrated in FIGS. 14 and 15, housing or switch box 80 is carried on the inner end of a hollow tube 80a which extends inwardly through an opening in the side of the pump housing to dispose such switch box within the V-shaped space between the two groups 34a and 34b of counter wheels, as best shown in FIG. 14, and in much the same manner as the shaft 72 of the embodiment above described. A series of magnetic switches 81a, 81b, 81c and 81d mounted within the box are each connected to an electrical wire which extends through the tube 80a for connection at its opposite end to one of a corresponding number of switches similar to the switches 54b–57b. More particularly, the box 80 and tube 80a are of explosion-proof construction.

As in the first embodiment of the invention, "b" series switches are enclosed within a weather-proof box mounted on the exterior of the housing so as to be selectively closed by a pointer or the like on the face of the box. More particularly, each of the magnetic switches 81a, 81b, 81c and 81d is connected in series with one of the exteriorly mounted switches, and such switches are in turn electrically connected to a relay for actuating a solenoid in the manner described in connection with the first embodiment. Thus, the switches 81a–81d are in effect substituted for the switches 54a–57a in the wiring diagram of FIG. 13, so that the selective closing of one of the exteriorly mounted switches will release the nozzle valve for movement to closed position upon closing of the one switch of the other series connected in series with the selectively closed one.

The illustrated switches 81a, 81b, 81c and 81d are individually caused to close by magnets 82a, 82b, 82c and 82d disposed about the periphery of the counter wheels of the two groups 34a and 34b. With the counter wheels in "zero" position, as shown in FIGS. 14 and 15, all of the switches 81a–81d are removed from magnetic influence by the magnets so that none of them are closed. However, as the counter wheels accumulate, magnet 82a on the left-hand counter wheel of group 34a will move into a position adjacent switch 81a so as to close same as the numeral "1" on such counter wheel moves into indicating position. Thus, as best shown in FIG. 14, the magnet 82a is mounted on the periphery of this counter near the numeral "3," so that the numeral "1" appears in indicating position as the switch 81a is closed.

Assuming that the operator has not selected the one dollar amount, the counter wheels will continue to accumulate until the magnet 82b on the middle counter wheel of the group 34b moves into a position opposite switch 81b for closing same. As best shown in FIG. 14, the magnet 82b is mounted on the periphery of the middle counter wheel adjacent the numeral "3" so that switch 81b is closed as the numeral "5" on the counter wheel moves into indicating position. Thus, if the operator had selected the five gallon amount, the signal would be imparted to the actuator for in turn permitting the nozzle valve to open.

However, assuming again that the operator had not selected the five gallon amount, the counter wheels will continue to accumulate until the magnet 82c on the left-hand counter wheel of the group 34a moves into position to close the switch 81c. It will be noted, in this respect, that this latter switch is spaced longitudinally of the tube from the switch 81a and that the magnet 82c is mounted on the opposite side of the periphery of the left-hand counter wheel from the magnet 82a so that there is no possibility of closing the wrong switch. Also, it can be seen that magnet 82c is mounted substantially adjacent the numeral "4" on the left-hand counter wheel so that it closes the switch 81c as the numeral "2" on such counter wheel moves into indicating position.

Assuming further that the operator has not selected the two dollar amount, the counter wheels continue to accumulate until the magnet 82d on the left-hand counter wheel of group 34b moves into position for closing the switch 81d. As best shown in FIG. 14, this latter magnet is mounted on the periphery of the left-hand counter wheel adjacent the numeral "9" thereof so that the switch 81d is closed as the numeral "1" on the left-hand counter wheel moves into position. Thus, this would serve to permit the valve to close in the event the operator had selected the ten gallon amount.

As in the case of the previously described embodiment of the invention, the reverse rotation of the counter wheels in returning to the "zero" position will reverse the above-described actuation of the magnetic switches within box 80. However as in the case of the first described embodiment, there is a normally closed switch which is opened by retraction of the solenoid plunger (see switch 53 in FIG. 13) so that the circuit is open during this time. As distinguished from the shaft of the first embodiment, the box and tube 80a remain in a stationary position relative to the counter wheels during their accumulation as well as during their reverse rotation. Although, as previously noted, the magnetic switches are sealed within box 80 in explosion-proof fashion, the construction of the box nevertheless permits the necessary magnetic influence on the switches due to the magnets on the counter wheels.

As previously noted, the box 80 and tube 80a may be passed laterally through an opening in the side of the pump housing so as to dispose the box in the position illustrated. Also, the end of the tube extending out of the pump housing may be connected in sealed relation to the weatherproof switch box for the selected switches, with the electrical wires shown in FIG. 15 extending through this connection. Still further, this tube may be flexible so as to permit its outer end to be raised above a desired level for safety purposes. That is, it may be connected with a switch box located relative to the level of the counter wheels in the manner shown in FIG. 5.

From the foregoing, it will be seen that this invention is one well adapted to attain all of the ends and objects hereinabove set forth, together with other advantages which are obvious and which are inherent to the apparatus.

It will be understood that cartain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for dispensing gasoline at an automobile service station, which includes a pump housing accumulating counter wheels rotatable within the housing for indicating the amount of gasoline dispensed, a hose leading from the pump housing, and a nozzle on the end of the hose having a normally closed valve; the improvement comprising a plurality of normally open electrical switches enclosed within a weather-proof box on the exterior of the pump housing, indicia on the exterior of the box adjacent said switches representing amounts of gasoline to be selected, a part movable over the indicia for closing a selected one of said switches within the box, additional normally open electrical switches each connected in series with one of said first-mentioned switches, means including parts on the counter wheels for successively closing selected ones of said additional switches so as to close the circuit including the closed first-mentioned switches when said selected amount of gasoline has been dispensed, and means responsive to closing of said circuit for causing the valve to move from open to closed position.

2. Apparatus of the character defined in claim 1, wherein said additional switches are also enclosed within the box on the exterior of the housing, a shaft is mounted for rotation in the housing close to the counter wheels, the parts on the counter wheels are engageable with parts on the shaft to rotate the shaft as the counter wheels accumulate, and a means on the said shaft extends through the pump housing for successively closing selected ones of the additional switches in response to shaft rotation.

3. Apparatus of the character defined in claim 2, wherein said first mentioned and additional switches are of a magnetic type, and said means on the shaft comprises a part movable over the exterior of the box adjacent said switches.

4. Apparatus of the character defined in claim 1, wherein said additional switches are of a magnetic type enclosed within an explosion proof box within the housing close to the counter wheels, there are magnets on the counter wheels rotatable into positions for closing selected ones of the additional switches as said counter wheels accumulate, and electrical wires extend within a tube between the two switch-boxes to connect the additional switches with the first-mentioned switches.

5. An apparatus for dispensing liquids such as gasoline at an automobile service station, and including a pump housing, two groups of accumulating counter wheels rotatable within the housing close to one another and having indicia thereon, the indicia on one group being in gallons and the indicia on the other group being in dollars, a hose leading from the pump housing, and a nozzle on the end of the hose having a normally closed valve; the improvement comprising means for selecting amounts of gasoline to be dispensed both in gallons and dollars, parts rotatable with the counter wheels of each group, a member within the pump housing close to each group of wheels and having parts thereon to be actuated by the parts on said counter wheels of both said groups during a continuous dispensing operation, and means responsive to such actuation of said parts of said member for causing the valve to move from open to closed position when the selected amount of gasoline has been dispensed.

6. Apparatus of the character defined in claim 5, wherein said member is a rotatable shaft, and the parts on the counter wheels and shaft comprise interengageable pins on the periphery thereof for intermittently rotating the shaft in response to rotation of the counter wheels.

7. Apparatus of the character defined in claim 5, wherein said member is an explosion proof box, and said parts comprise magnets on the periphery of the counter wheels and magnetic switches on the interior of the box.

8. Apparatus of the character defined in claim 5, wherein the selecting means includes a plurality of normally open electrical switches and a manually operable part on the exterior of the housing for closing a selected one of said switches.

9. An apparatus for dispensing gasoline at an automobile service station, which includes a pump housing, accumulating counter wheels rotatable within the housing for indicating the amount of gasoline dispensed, a hose leading from the pump housing, and a nozzle on the end of the hose having a normally closed valve; the improvement comprising a plurality of normally open, magnetic type electrical switches, magnetic means movable in response to the counter wheels into positions for successively closing individual ones of said switches during dispensing of gasoline from the pump housing, indicia on the exterior of said pump housing representing amounts of gasoline to be dispensed, a part manually movable over the indicia into a position for selecting an amount to be dispensed; means responsive to movement of said part into said selecting position for enabling only the circuit in which said individual one of said switches is disposed to be closed upon dispensing of said selected amount, and means responsive to closing of said circuit for causing the valve to move from open to closed position.

10. An apparatus of the character defined in claim 9, wherein said last mentioned means includes a plurality of additional normally open electrical switches each connected in series with one of said magnetic type switches, and said part includes means for closing selected ones of said additional switches upon movement over said indicia.

References Cited by the Examiner

UNITED STATES PATENTS

| | | | |
|---|---|---|---|
| 2,527,703 | 10/1950 | Carbonaro | 222—20 |
| 2,643,792 | 6/1953 | Daley et al. | 222—14 |
| 3,053,414 | 9/1962 | Rapisarda | 222—20 |
| 3,079,045 | 2/1963 | Kimbull et al. | 222—20 |
| 3,128,910 | 4/1964 | Calhoun | 222—20 |
| 3,138,289 | 6/1964 | Jones et al. | 222—20 |

RAPHAEL M. LUPO, *Primary Examiner.*

CHARLES R. CARTER, *Examiner.*